US006735203B1

(12) United States Patent  
Heiman

(10) Patent No.: US 6,735,203 B1  
(45) Date of Patent: May 11, 2004

(54) SWITCH ARRANGEMENT

(75) Inventor: Petri Heiman, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/480,235

(22) Filed: Jan. 10, 2000

Related U.S. Application Data

(63) Continuation of application No. PCT/FI98/00588, filed on Jul. 14, 1998.

(30) Foreign Application Priority Data

Jul. 14, 1997 (FI) .................................................. 972979

(51) Int. Cl.⁷ ............................................. H04L 12/28
(52) U.S. Cl. ................... 370/394; 370/386; 370/389; 370/395.3; 370/417; 370/412; 370/429
(58) Field of Search ................................. 370/351, 352, 370/356, 388, 394, 396, 397, 399, 400, 404, 412, 417, 353, 354, 386, 389, 392, 395.1, 395.3, 395.31, 401, 413, 415, 428, 429

(56) References Cited

U.S. PATENT DOCUMENTS

| | | | | |
|---|---|---|---|---|
| 5,173,897 A | | 12/1992 | Schrodi et al. | 370/394 |
| 5,319,360 A | * | 6/1994 | Schrodi et al. | 370/390 |
| 5,481,536 A | | 1/1996 | Reisch et al. | 370/394 |
| 5,483,521 A | | 1/1996 | Aramaki | 370/396 |
| 5,491,728 A | * | 2/1996 | Verhille et al. | 370/394 |
| 5,859,835 A | * | 1/1999 | Varma et al. | 370/229 |
| 5,987,028 A | * | 11/1999 | Yang et al. | 370/380 |

* cited by examiner

Primary Examiner—Phirin Sam  
(74) Attorney, Agent, or Firm—Squire, Sanders & Dempsey L.L.P.

(57) ABSTRACT

The invention relates to a switch arrangement for a packet-switched telecommunications network. The switch arrangement comprises several input ports and several output ports, a switching fabric (SWN), and an output unit ($OU_i$) between each output port and the switching fabric, the output unit comprising an output buffer (OB) in which outbound packets are stored. In the switch, virtual connections are used for packet switching and serial numbers in packets belonging to each virtual connection are used to identify the relative order of the packets. The output unit ($OU_i$) maintains virtual connection-specific information on the serial number of the currently anticipated packet, and the packets belonging to a given virtual connection are ordered in the correct sequence in accordance with the serial numbers of the packets. To provide a simple and efficient arrangement in terms of hardware configuration, packet data are stored in a separate re-sequencing memory (RST1, RST2) in a memory area that is defined at least on the basis of the serial number of the packet, and by the re-sequencing memory, packets are transferred to the output buffer by searching in each case packet data from that memory area of the re-sequencing memory which is defined at least on the basis of the anticipated serial number, whereby when the data of a given packet are found the packet is transferred to the output buffer. When a packet is transferred to the output buffer, the serial number of the anticipated packet is updated.

9 Claims, 4 Drawing Sheets

SWITCH ARRANGEMENT

Figure 1:
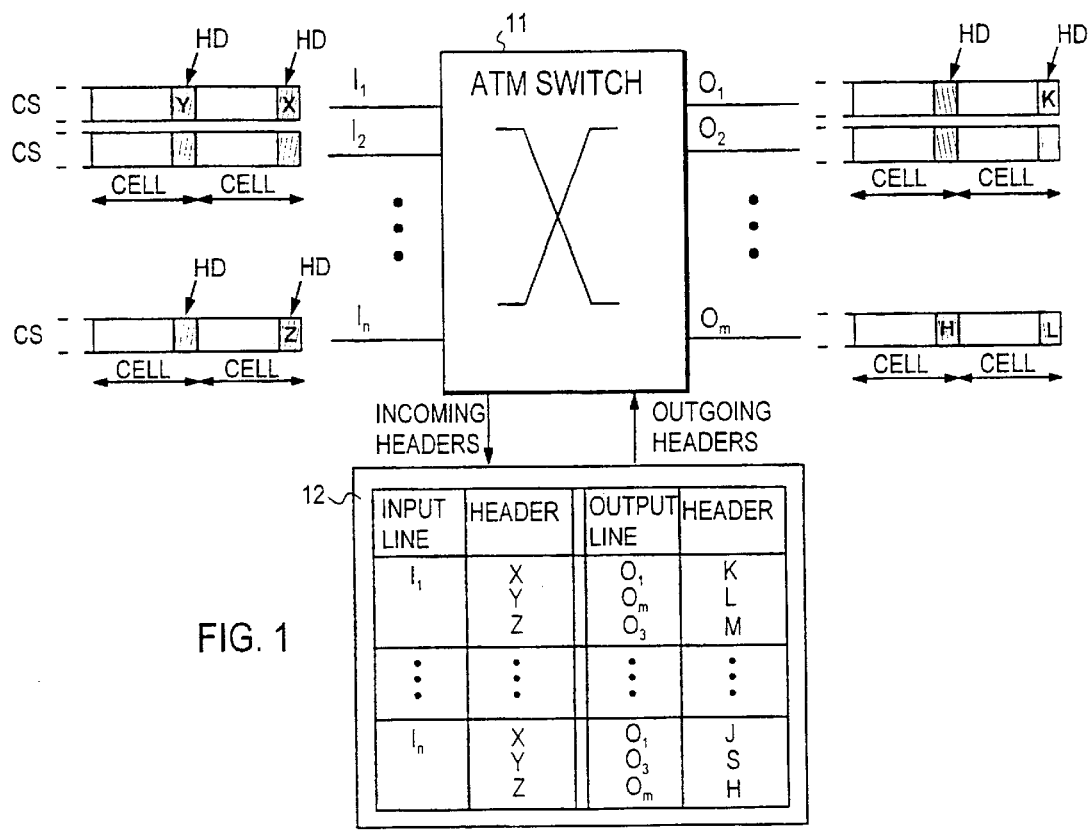

This application is a continuation of PCT/FI98/00588, filed Jul. 14, 1998.

FIELD OF THE INVENTION

The invention relates generally to switching implemented in a packet-switched telecommunications network. More particularly, the invention relates to a switch arrangement used in such a network, specifically an ATM network.

BACKGROUND OF THE INVENTION

To aid the understanding of the following description, some terms to be used later will first be defined.

A switching fabric or switching matrix (both terms are used) is comprised of a plurality of switching elements which are either identical or dissimilar and are interconnected according to a given topology. In the (English-language) literature of the art, such a switching matrix may also be called a "switching network", since the switching elements form a network having the given topology. Hence, a switching matrix is considered to have a defined form when its switching elements and their interconnections are known.

A switching fabric is composed of switching elements by connecting a number of switching elements into a network comprising switching elements in parallel and in succession. Parallel switching elements make up one switching stage. Switching elements in successive switching stages are interconnected by internal links in accordance with the above topology.

The term switch is used to denote the entity configured about a switching matrix. Hence, a switch can denote any means employed for signal switching in a telecommunications network. In the present context, a switch is a packet switch as the invention is related to switching in a packet-switched telecommunications network, particularly an ATM network. A switch is also sometimes termed a switching system.

ATM (Asynchronous Transfer Mode) is a connection-oriented packet-switching technique, which has been selected by the international organization for telecommunications standardization, ITU-T, as the target transfer mode solution for implementing a broadband multimedia network (B-ISDN). In an ATM network, the problems of conventional packet-switched networks (such as X.25 networks) are overcome by transmitting short packets of a constant length (53 bytes) called cells. Each cell comprises a 48-byte payload portion and a 5-byte header. The header comprises, along with other data, address information on the basis of which the cell is routed in an ATM network. Further discussion of an ATM network herein will be omitted as non-essential subject to the understanding of the invention. When required, a closer description of this topic can be found in international standards and textbooks of the art.

Switches in a conventional TDM network (Time Division Multiplexing, also called by the name STM, Synchronous Transfer Mode) cannot be directly implemented to handle the switching in an ATM network. Neither are the switching solutions developed for conventional packet networks usually suitable as switches for an ATM network. The selection of an optimum ATM switching architecture is namely influenced not only by the fixed cell size and the limited functionality of the cell header but also by the statistical behaviour of the cell stream and the fact that an ATM switch must operate at a very high rate (currently typically about 150 . . . 600 Mbit/s).

FIG. 1 shows schematically an ATM switch seen from the outside. The switch has n input lines $I_1 \ldots I_n$ and m output lines $O_1 \ldots O_m$. A cell stream CS arrives over each input line to the ATM switch 11. The header of an individual cell in the cell stream is denoted by reference HD. In the ATM switch, the cells are switched from the input line $I_i$ to the output line $O_1$, and simultaneously the value of the cell header is translated from an incoming value to an outgoing value. For this purpose, the switch includes a translation table 12 by means of which said translation is made. It is to be seen from the table that, for example, all the cells received over line $I_1$ and having a header with a value X are switched onto output port $O_1$ whereby their header is simultaneously given the value K. Cells present on different input lines may have headers of equal value; for example, cells received at input line $I_n$ with the same header value X are also switched onto output line $O_1$, but their header is given the value J on the output line.

A prior art header translation method, which will be used in describing the present invention, is to translate the header in steps by using unique connection identifiers internal to the switch, such as the identifier ICI on the input side and the identifier ECI on the output side. In that case, the header translation chain will be $VPI_{in}/VCI_{in} \rightarrow ICI \rightarrow ECI \rightarrow VPI_{out}/VCI_{out}$. The advantage of such a procedure is that the identifiers ICI and ECI can be direct memory addresses by means of which the connection-related data can be rapidly accessed.

Hence, the main tasks of a switch are: transfer of cells (packets) from the input line to the desired output line, and header translation. Occasionally, however, as is also evident from the figure, two cells may be simultaneously contending for access onto the same output line. For this purpose, the switch must have buffering capacity to avoid the necessity of discarding cells in such a situation. Hence, the third main task of a switch is to provide buffering. The manner in which these three main tasks are performed and in which part of the switch the implementation is handled distinguishes different switching solutions from one another.

ATM switching fabrics, on the other hand, can be subdivided into two classes depending on whether the switching elements used in the fabric are buffered or unbuffered.

In a fabric using unbuffered switching elements, routing of cells through the fabric operates at the cell level in such a way that a route is separately selected for each cell irrespective of which virtual channel the cell belongs to. In simplified rendition, proceeding of cells through the fabric may be thought of as comprising two steps. In the first step, the cells are sent from the input ports through the fabric, and in the second step either the switching elements or the output ports give an indication to the input port which cells were successful in traversing the fabric. The latter step must be performed, since if the cells possibly attempt to use the same internal link of the fabric, all simultaneous cells except one must be discarded since the switching elements have no buffers. The problem with such a switching fabric is that the operation of all its elements must be mutually synchronized, i.e., all elements and input and out-put ports must be in the above-described steps at the same time. Since cell transmission is very rapid and in practice even several further steps may be necessary besides the two described above, synchronization cannot be achieved merely by means of handshaking signals between the elements, but all elements must be synchronized from a common clock source, and it is difficult to distribute the clock signal to all elements if the switching fabric is very broad and it has been necessary to divide it among several plug-in units. It may also be noted that even a switch provided with non-buffered switching elements must have buffering capacity either in the input or in the output ports of the fabric to avoid the need of discarding cells contending simultaneously for the same output line of the switch.

A switching fabric comprised of buffered switching elements does not have the above synchronizing requirement. The selection of the route of the cells through the switching fabric can be virtual channel-related. For this purpose, however, a record of the load on the internal links of the switching fabric must usually be kept. A buffered switching fabric is usually blocking at the connection level, as to construct it to be non-blocking usually requires so much extra capacity that this is no longer economically feasible. In a blocking fabric, the selection of the route for the connection is a highly critical factor when it is attempted to reduce the blocking.

On account of the foregoing, many manufacturers have sought a solution from a method in which the route is selected at the cell level also in a switching fabric provided with buffered switching elements. To avoid the necessity of keeping a record of the load on the internal links of the fabric and to enable even distribution of the load, the cell route is usually selected at random. (The selection may also be done in accordance with a suitable non-random algorithm.) In that case, the switching fabric can be constructed to be non-blocking at reasonable cost.

Since the route of the cells varies in such random routing, it is possible that a cell sent later travels faster through the switching fabric and overtakes a cell sent earlier. This is due to the fact that the load on the switching elements and thereby also the fill rates of their buffers vary constantly, and hence also the dwell time of the cell in the fabric varies at different times and over different routes. Restoring the order of the cells necessitates special solutions known as re-sequencing.

In principle, there are two basic solutions for cell re-sequencing depending on which part of the switching fabric the re-sequencing is performed in. The cells can be re-sequenced either after the switching fabric in re-sequencing (micro)circuits provided for this purpose (alternative 1), or the re-sequencing can be performed already within the switching fabric between its switching stages (alternative 2).

The factor common to the above solutions is that the transit time used by the cell in traversing the switching fabric (alternative 1) or to the switching elements (alternative 2) is measured for example by using a time stamp, and thereafter the cell is delayed for a time sufficient for a predetermined total transit time to be exceeded. This ensures that the delay of all cells through the switching fabric remains the same. The drawback of these solutions, however, is that they require a very complex circuit using parallel processing at the output ports of the switching fabric (alternative 1) or in the switching elements (alternative 2).

One re-sequencing implementation relating to alternative 1 is disclosed in U.S. Pat. No. 5,481,536. This solution utilizes serial numbers for cells, by means of which the relative order of the cells over the same connection can be inferred. The cells are written into a common memory, and the addresses by means of which cells are read out from the common memory are searched from a content addressable memory (CAM).

Also this solution has complex implementation and requires a special memory (CAM) that is not equal to conventional (fast) memories in terms of retrieval times and cost.

U.S. Pat. Nos. 5,319,360 and 5,173,897, on the other hand, disclose an ATM node in which the cells on a virtual connection also have a serial number by means of which the relative order of the cells is identified. In the output unit between the switching fabric and the output port of the node, the cells are stored in a memory at the head of which a shift register section is provided, followed by a first FIFO unit. A cell is read out from the head of the queue onto a latch wherefrom the cell is further read out from the node. Prior to reading out from the latch, the connection identifier of the cell on the latch is compared with the connection identifiers of all other cells in the shift register section and the FIFO units, and an additional comparison is carried out on all cells having the same connection identifier as the cell on the latch, in which comparison the serial numbers of these two cells are compared. If the cell in the memory turns out to be older, it replaces the cell on the latch and the cell on the latch is transferred back to the memory to replace the older cell. In this way, the oldest stored cell pertaining to said connection is obtained as the cell to be transferred.

The drawbacks of this solution include a very complex memory arrangement and the heavy comparison process it requires to find the oldest stored cell in each case.

SUMMARY OF THE INVENTION

It is an object of the present invention to eliminate the drawbacks described above and to provide a method wherewith the re-sequencing of packets can be implemented with as simple equipment as possible without any heavy comparison process.

This object is achieved with a solution as defined in the independent claim.

The invention utilizes a basic solution as described above, in which each packet (or cell) over the connection has an order stamp that is a serial number by means of which the cells on the connection can be ordered in the correct sequence. Furthermore, the invention utilizes a basic solution maintaining a serial number for an anticipated packet. The idea is to store the packet or the information relating thereto (e.g. a memory pointer) in a memory area that is dependent on at least the serial number of the packet in accordance with a given predetermined relationship. This is done at least every time it is detected on the basis of the anticipated serial number that the order of the packets has changed. The packet may also be transferred directly to the output buffer if the serial number of the incoming packet corresponds to the serial number of the anticipated packet (that is, if order of the packets has not changed). By performing the storing in a memory area dependent on the serial number of the packet, at least each time packets are not being received a packet to be transferred to a buffer (or its memory pointer) can be searched from the memory area that is dependent on the current anticipated serial number in accordance with the same relationship.

In a particularly preferred embodiment of the invention, storage in memory takes place in a memory area defined merely on the basis of the serial number of the packet and reading out from the memory from a memory area defined merely on the basis of the anticipated serial number. In this way, the memory capacity required can be minimized.

LIST OF DRAWINGS

Figure 2:
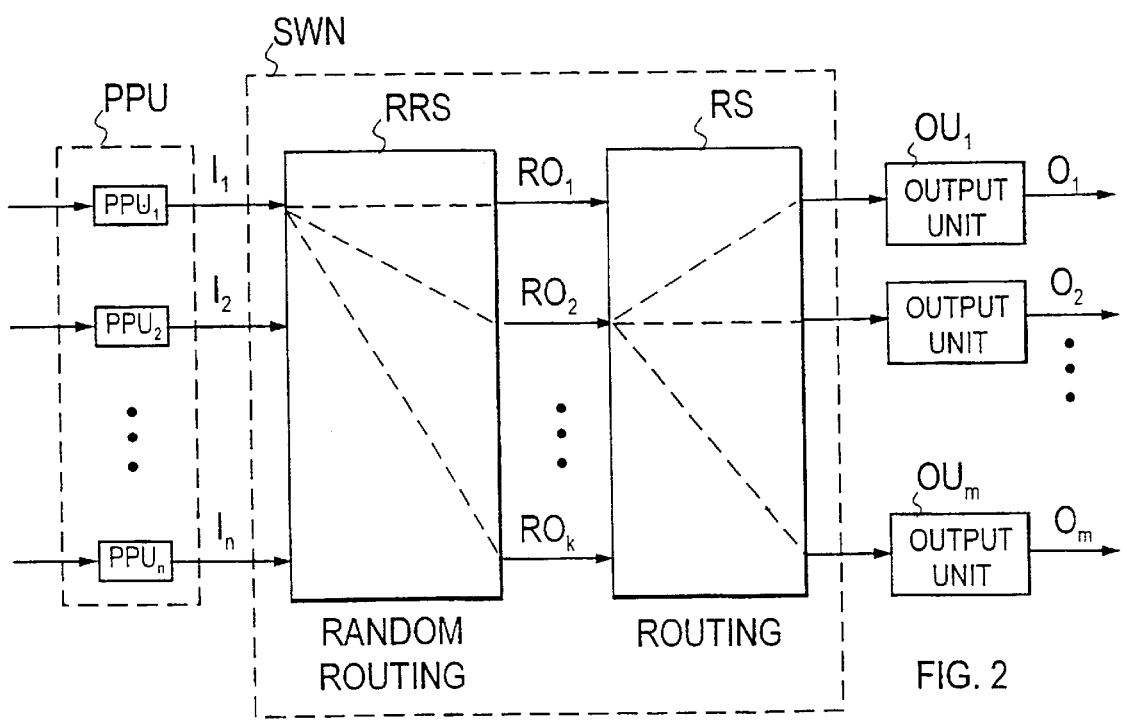
Figure 3:
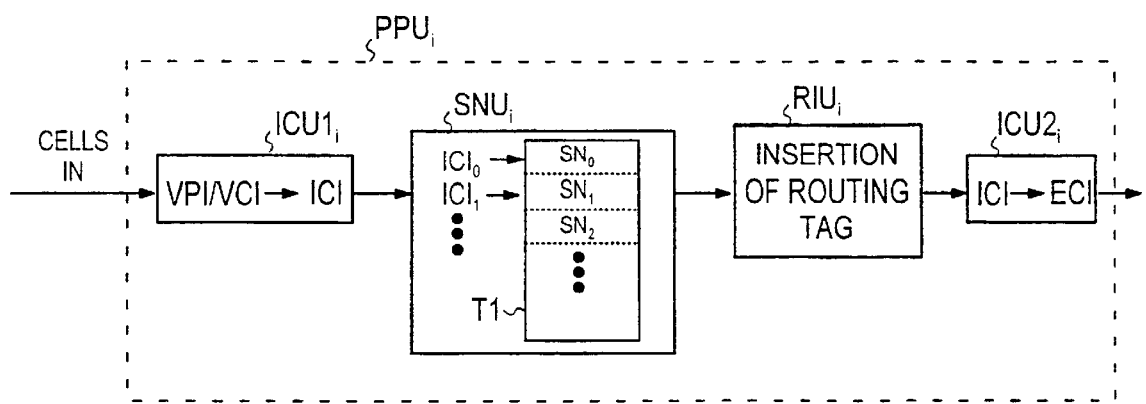
Figure 4:
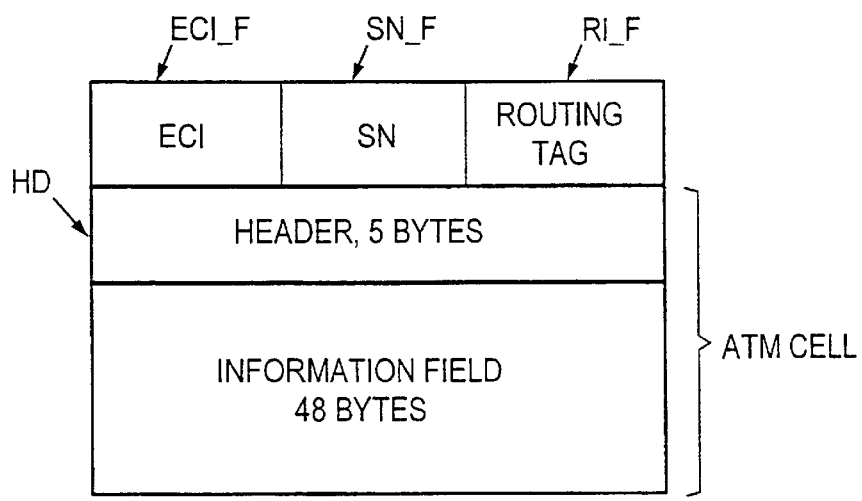
Figure 5:
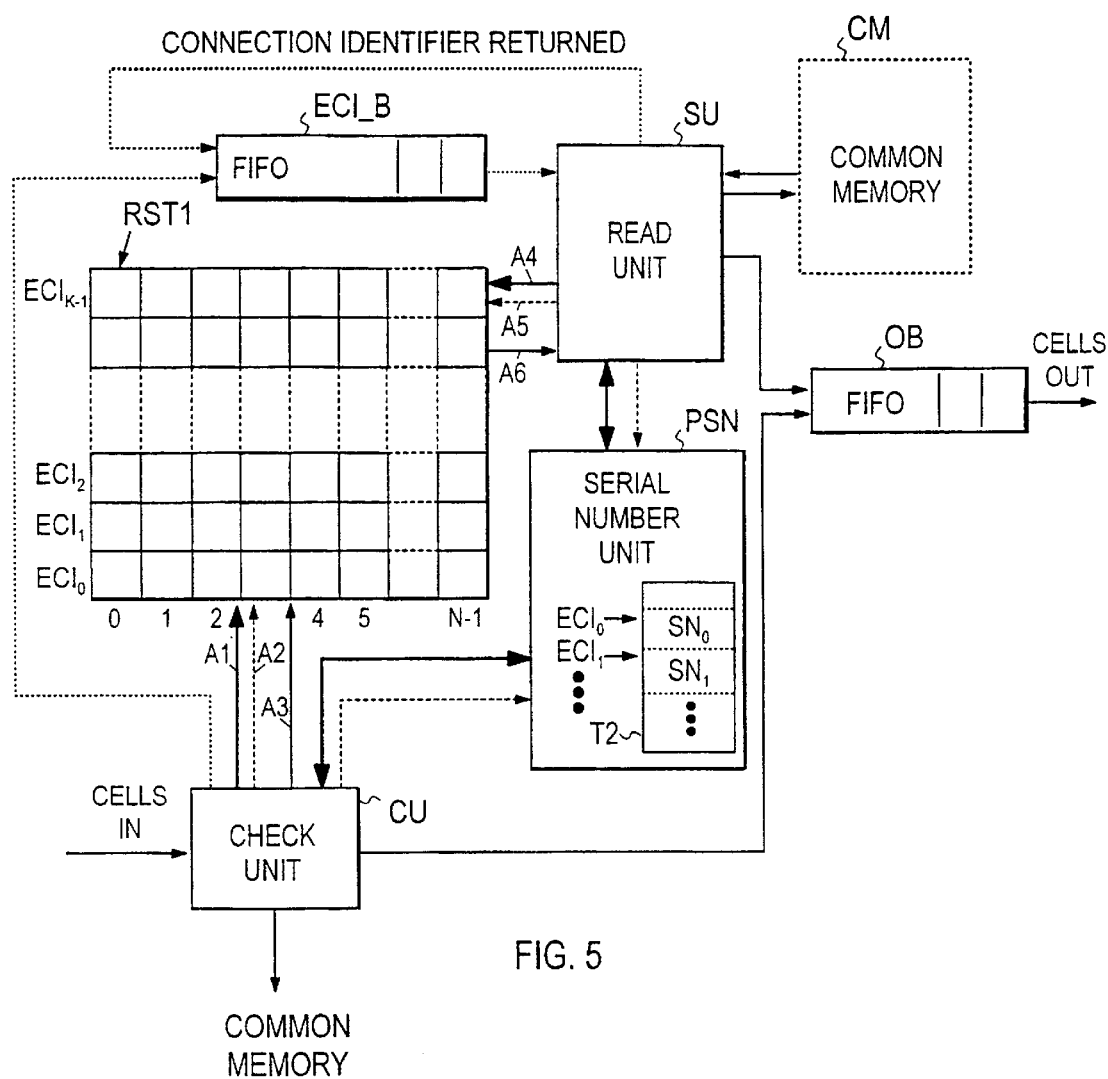
Figure 6:
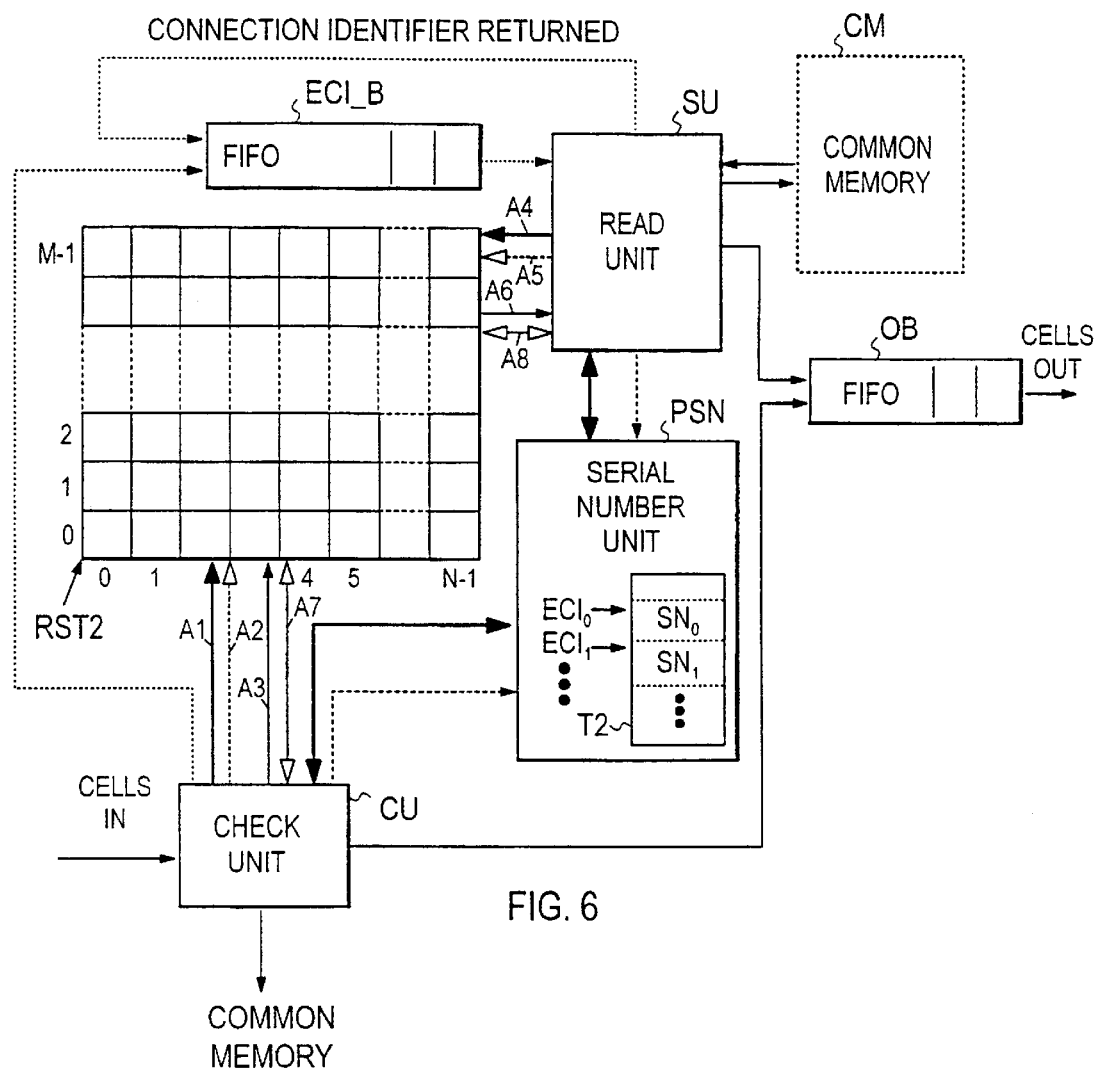

The invention and its preferred embodiments will be described more closely in the following with reference to FIGS. 2 . . . 6 in examples in accordance with the accompanying drawings, in which FIG. 1 depicts the basic principle of ATM switching, FIG. 2 depicts a switch in accordance with the invention on a general level, FIG. 3 illustrates cell processing performed at the edge of the switch, FIG. 4 depicts the structure of a cell traversing the switching fabric, FIG. 5 shows a block diagram of a unit included in each output port of the switching fabric when the unit is implemented in accordance with a first embodiment of the invention, and FIG. 6 shows a block diagram of a unit included in each output port of the switching fabric when the unit is implemented in accordance with a second embodiment of the invention.

DETAILED DESCRIPTION OF THE INVENTION

To elucidate the solution in accordance with the invention, the following will first give a description of a switch construction that is advantageous from the point of view of the invention on a general level. At this level, the solutions are still known as such.

The switch can be functionally divided into three parts as shown in FIG. 2: a cell pre-processing unit PPU, a distribution section RRS, and a routing section RS. Only the last two of these contain switching elements, and hence they form the actual switching fabric (or switching matrix) SWN.

The starting-point of the invention is to consider separately each connection (switching) going through the switching fabric. For this purpose, a cell pre-processing unit PPU is provided ahead of the switching fabric, comprising one pre-processing unit $PPU_i$ for each input line $I_i$ (i=1 . . . n). These units assign serial numbers for cells on each connection in such a way that each connection has a unique serial numbering for cells, being independent of the other connections. When the connection is set up the serial numbering of the cells may start for example with zero and increase to an upper limit, for example to the value N−1, whereafter the numbering again starts from zero. However, all connections use the same serial number range (0 . . . N−1) wherefrom numbers are assigned in succession.

The distribution section RRS routes the cells at random or in accordance with a given predetermined algorithm in such a way that cells arriving at a given input line are distributed to preferably all output lines of the distribution section as evenly as possible. This enables the cell stream to be evenly distributed among all available paths, which again will diminish the internal blocking of the switch. The routing section RS for its part routes the cell to the correct output port on the basis of the routing tag contained in the cell. Hence, the routing section is such that all cells with a given output port address are routed to said output port irrespective of which input port of the routing section they are sent to from the distribution section.

In the switch in accordance with the invention, the path traversed by the cell is thus comprised of a first part selected at random or in accordance with a given algorithm and a second part that is selected on the basis of the routing information in such a way that the cell is directed to the correct output port. Such a structure is previously known.

The type or detailed structure of the switching fabric is not essential to the invention, since it is not essential to the invention how the routing of cells is implemented. The routing may be implemented in any known manner. The advantage of a randomly routing switching fabric is, however, that the fabric can distribute the load relatively evenly, in which case there is also lesser probability of the order of the packets being changed. Hence, it is advantageous that the switching fabric comprises a distribution section from each individual input line ($I_j$, j=1 . . . n) of which routes to preferably all output lines ($RO_1$ . . . $RO_k$) of the distribution section can be established, and that the switching fabric comprises a routing section in which at least one route from each input line ($RO_1$, i=1 . . . k) to the desired output line ($O_j$) (according to the routing information) can be established.

FIG. 3 illustrates the structure of each pre-processing unit $PPU_i$. The incoming cells are first applied to a first conversion unit $ICU1_i$, forming from the VPI/VCI identifier included in each cell an internal connection identifier ICI to be used on the input side of the switching fabric and inserting it into the cell. Thus, on the input side each connection receives an unique connection identifier internal to the fabric, by means of which the cells of different connections are distinguished from one another within the switching fabric. It is advantageous to use a connection identifier internal to the switching fabric to make this distinction, since the VPI/VCI identifiers do not use a single continuous value range, which on the other hand is achieved with an internal connection identifier.

From the first conversion unit, the cells are applied to a numbering unit $SNU_1$, comprising a table T1 maintaining connection-specifically one order stamp $SN_1$. This order stamp is the serial number of the cell that is the next to be delivered over the connection (or the serial number of the last cell that passed over said connection, incremented by one at the arrival of the cell to give the cell the correct serial number). At the start of the connection, this number is initialized. In the numbering unit, the value of the connection identifier ICI attached to the cell is read, and on the basis of the read value, the corresponding serial number is searched from the table. A predetermined number of discrete values is used as serial numbers, for example integer values obtained from a modulo counter, in such a way that the counter counts cells from the start of the connection for example from zero to (N−1), whereafter it again starts from zero, etc. The serial number is attached to the cell.

In the pre-processing units, a routing tag internal to the switch may also be inserted into the cells (in a known manner); this is performed in the routing tag insertion unit $RIU_i$. The last element in each pre-processing unit is a second conversion unit $ICU2_i$ in which the connection identifier ICI of the input side is converted to a connection identifier ECI of the output side. As was stated previously, it is advantageous to use a unique internal connection identifier on the input and output sides to enable rapid access to the connection-related data (both identifiers use the same address value range).

Hence, each cell arriving at the switching fabric is as shown in FIG. 4. As is known, an actual ATM cell comprises a payload of 48 bytes and a header of 5 bytes. Preferably three identifier fields, each of which comprises an identifier internal to the switch that is removed at the output of the switch, are inserted into this ATM cell. The header field need not necessarily be transported through the switching fabric, but it can be removed at the input port of the switching matrix and a header field provided with new information inserted at the output port of the switching matrix. The routing tag field RI_F comprises a routing tag internal to the switch, wherewith the cell is routed in the switch (routing section) in the known manner to the correct output port. The serial number field SN_F contains a serial number assigned by the numbering unit, either a value directly obtained from table T1 or a value formed by means of a value contained in the table. The connection identifier field ECI_F contains a connection identifier ECI assigned by the second conversion unit.

The cell distribution performed by the distribution section can be implemented for example in such a manner that those bits in the routing tag which correspond to the switching stages in the distribution section are formed randomly or in accordance with a given algorithm, and hence the cells are routed in the distribution section at random or in accordance with said algorithm. The entire routing tag can be formed at the input port of the switching matrix, or the part corresponding to the random distribution stages can be left unformed, in which case said stages perform the random distribution independently. Since, however, the routing can be implemented in any known manner, no routing tag is necessarily needed in the cell.

The following will describe the structure and operation of an individual output unit $OU_i$ in detail.

FIG. 5 illustrates a functional block diagram of an individual output unit when the output unit is implemented in accordance with a first embodiment of the invention. The core of the output unit is constituted by a re-sequencing table (or generically, a re-sequencing memory) RST1, in which some of the incoming cells (or information on the cells, such as memory pointers) are stored. In this embodiment, the re-sequencing table comprises one row for each connection and a number (N) of memory locations corresponding to the number of re-sequencing values for each connection (the number of connections is K). The table thus comprises a total of K rows and N columns. A table element at the junction of one row and column constitutes one memory location, and hence there is a total of K×N memory locations in the re-sequencing table.

A check unit CU is provided at the input of each output unit, which reads the connection identifier and serial number from each incoming cell. A serial number unit PSN maintains a serial number value for each connection, the value being the serial number of the next anticipated cell on the connection. For this purpose, the unit comprises a table T2, which is a table similar to the table T1 of the pre-processing unit. Upon arrival of the cell, the check unit reads from table T2, on the basis of the connection identifier value of the output side, the serial number value that is anticipated next over this connection, and compares it to the serial number value of the cell that has arrived. If the values are equal, the check unit transfers the cell directly to a FIFO-type output buffer OB and increments the value of the serial number in table T2 by one. If the serial number values are not equal, the check unit stores the cell in the re-sequencing table, in the row corresponding to the connection identifier of the cell in a memory location corresponding to the serial number of the cell. Each time the check unit stores the cell in the re-sequencing table, it also stores the connection identifier carried by the cell in a FIFO-type connection identifier buffer ECI_B. Storing in the re-sequencing table and the connection identifier buffer is thus performed when the cell does not arrive at that point of the cell queue of the connection which is implied by its serial number. In that case, the value of the serial number in table T2 is not incremented either.

The output unit further comprises a separate reading unit SU that continually scans the cells stored in the re-sequencing table and moves them into the output buffer in such a way that in the output buffer the cells of each connection are again in the correct order. The reading unit may operate in parallel with the check unit or, for example, when no cells arrive at the output port. The reading unit first reads the connection identifier from the head of the connection identifier buffer ECI_B and on the basis thereof the serial number anticipated on said connection from the serial number unit. Thereafter the reading unit searches a cell from the memory location in the re-sequencing table that would correspond to said serial number and connection identifier. If there is a cell in this memory location, the reading unit transfers it to the output buffer and increments the value of the anticipated serial number by one. If there is no cell in said memory location, the reading unit returns the connection identifier to the buffer ECI_B and takes from the head of the buffer a new connection identifier on which it again performs the above operations. Thus, the anticipated serial number is only updated when the cell is transferred to the output buffer. If a cell is found, one can be certain that it is transferred to the cell queue of the connection, to the position implied by its serial number.

At the start of the connection, the anticipated serial number on said connection is updated to zero. If a cell with the number zero, for example, arrives first over the connection, it is directly transferred to the output buffer. If the serial number of the first arriving cell is one, for example, it is stored in column one, in a memory location corresponding to the connection identifier. The connection identifier is also stored in buffer ECI_B. If the serial number of the next cell arriving over the connection is two, for example, the cell is again stored in the re-sequencing table and the connection identifier in the buffer. When the reading unit in this case reads the cells prior to the arrival of serial number zero, it finds that the re-sequencing table contains no cells that could be transferred further (since there are no cells in the memory area corresponding to zero). The anticipated serial number remains zero until the cell provided with serial number zero arrives. When this cell arrives, it is directly transferred to the output buffer and the anticipated serial number is updated to one. When the reading unit thereafter takes the identifier of said connection from the buffer and the anticipated serial number from the serial number unit PSN, it finds a cell with serial number one in the re-sequencing table and transfers it to the output buffer. After the transfer, the anticipated serial number is updated to two, as a result of which the reading unit finds a cell with number 2 in the re-sequencing table.

Instead of the entire cell, only the connection identifier and a pointer to a common memory—storing all cells that cannot be directly transferred to the output buffer—can be stored in one memory location of the re-sequencing table. This common memory is denoted by reference CM in the figures, and it is shown in broken line since it is an optional part of the structure. Hence, the re-sequencing table contains a cell or other data relating to the cell on the basis of which the cell can be found. A specific pointer value (or bit) can indicate that the cell has not been stored in a common memory.

The memory space occupancy of the solution described above is rather high. In practice, a realistic value for the number of order stamps N is 512. If it is presumed that only pointers to a common memory are stored in the re-sequencing table and that the connection identifier is represented by 14 bits, in which case there are $2^{14}=16384$ connections per port, and that the space occupied by each cell in the re-sequencing table is 4 bytes (connection identifier 2 bytes and pointer 2 bytes), the memory space required by the re-sequencing table is 512×16384×4 bytes= 32 MB.

FIG. 6 illustrates a far more advantageous embodiment in view of memory space occupancy. Also in this case, the re-sequencing table (or generically re-sequencing memory) RST2 comprises a number (N) of columns corresponding to the serial numbers, but the value M has been selected as the number of rows, which is a suitable limit for the likelihood being very small that there is simultaneously a need in the re-sequencing table for more than M cells for cells provided with the same serial number. In practice, M can be considerably smaller than the number of connections, as will be seen hereinafter.

Such heavy compression of the re-sequencing table can be substantiated with the following considerations. In low speed systems, the order of cells on connections hardly ever changes (in which case there is no need for a large re-sequencing table either), since in them the preceding cell has traversed the switching fabric before the next cell has even arrived at the input port of the switching fabric. In accordance with standard 1.371 of the international standardization body ITU-T, the cell delay in a switching fabric may be 300 microseconds at maximum. The speed of a connection over which cells arrive at intervals of 300 microseconds is 1.4 Mbit/s (=1/0.0003×53(bytes in cell)×8 (bits in byte)). Hence, the cell sequence on connections with a rate less than 1.4 Mbit/s can never change. Since the randomly routing section described above distributes the load relatively evenly, the likelihood of one route in the switching fabric being significantly faster than another route is very small on faster connections. Let us presume an overtake situation in which a later cell would find in the fabric a route with queues in which there are, for instance, 50 cells less than in the route taken by the previous cell (which is highly improbable). In such a case, the connection rate should be at least 12.4 Mbit/s (620/50 Mbit/s) in order for it to be even possible for the order of the cells to be changed, presuming that links to the fabric are of level STM-4 (620 Mbit/s). Low speed connections, a large number of which can be accommodated on a link, thus hardly ever pose problems in terms of changed order of the cells. Faster connections, on the other hand, pose the more problems the higher their bandwidth consumption is, but at the same time a smaller number of such connections can be accommodated on the link (a maximum of 50 in the case described above). It is thus possible to strongly reduce the number of rows in the re-sequencing table.

When in the embodiment of FIG. 6 the check unit detects that the serial number does not correspond to the anticipated serial number, it stores the cell in the column corresponding to its serial number, in the first empty memory location. The check unit simply goes through a maximum of M rows, starting from row zero, in the column indicated by the order stamp and stores the cell (or its connection identifier and memory pointer) in the first empty memory location and the connection identifier in buffer ECI_B.

If, on the other hand, at a given moment no cells arrive at the output unit or the reading unit otherwise has free time, it examines whether the re-sequencing table contains cells suitable for sending. In such a case, the reading unit searches from the head of the connection identifier buffer the connection identifier value of the output side and the anticipated serial number from the serial number unit (as in the embodiment of FIG. 5). Thereafter it searches from the beginning of the column corresponding to the serial number (starting from row zero) whether said column contains the same connection identifier value. Immediately upon having found the correct connection identifier, the reading unit transfers said cell to the output buffer and increments the anticipated connection identifier by one. If the column does not contain the correct connection identifier, the reading unit returns the connection identifier to the tail of the queue in buffer ECI_B and takes from the head of the queue a new connection identifier on which it performs the same operations.

In FIGS. 5, and 6, transferred cells (or information associated with a cell) are denoted by thin arrows, transfer of serial numbers by thick arrows, transfer of connection identifiers by broken line arrows, transfer of a row number with light-headed broken line arrows, and memory location occupancy state information by light-headed arrows. In FIG. 5, arrows A1 and A2 illustrate the transfer of (the coordinates of) a pointer for indicating the memory location in the re-sequencing memory whereinto the cell is transferred in accordance with arrow A3. Arrows A4 and A5 respectively illustrate the transfer of (the coordinates of) a pointer for indicating the memory location in the re-sequencing memory wherefrom the cell is read in accordance with arrow A6. Similarly, arrows A1 and A2 in FIG. 6 illustrate the transfer of (the coordinates of) a pointer for indicating the memory location in the re-sequencing memory whereinto the cell is transferred in accordance with arrow A3. Further, arrows A4 and A5 illustrate the transfer of (the coordinates of) a pointer for indicating the memory location in the re-sequencing memory wherefrom the cell is read in accordance with arrow A6. Arrows A7 and A8, on the other hand, illustrate the information to be transferred in the search and management of an empty memory location. Moreover, the figures do not show the means carrying out the above conversion ECI→$VPI_{out}$/$VCI_{out}$, as said means are not relevant to the actual invention.

The reading principle described above realizes the fairness principle between different connections in the sense that the more cells a connection has in the re-sequencing table, the more often the identifier of that connection is read from the connection identifier buffer.

The number of rows (value of M) in the re-sequencing table of FIG. 6 and the requisite memory capacity can be roughly estimated for example as follows. If the re-sequencing table RST2 of FIG. 6 is implemented with a fast memory, such as SSRAM (Static Synchronous RAM), currently having retrieval times below 20 ns, and cells arrive at the re-sequencing table at a STM-4 rate, for instance (i.e. at intervals of 0.68 $\mu$s), there is time for the unit during each cell to read or write into memory at least 34 (=680/20) times. If the implementation is as described above, M shall have a value smaller than 34 if it is desired to ensure that there is time for at least one cell search per each cell arriving at the output. If the value of M is 32, for example, the number of order stamps is 512, for example, and the re-sequencing table only stores the connection identifier (2 bytes) and a pointer (2 bytes) to the shared memory, the memory space requirement for the re-sequencing table is 512×32×4 bytes= 64 kB. Hence, it is even possible in practice to increase the value of N to enable even better distribution of the cells of the connections in the re-sequencing table.

The size of the common memory need not be very large; a memory for approximately 100–200 cells is sufficient in practice.

The above describes a straightforward procedure in which the cell is placed in the table directly in the position indicated by the order stamp, that is, in an augmenting order. It is also possible that the position of the cell is determined by a known hash function whose value is calculated by means of the order stamp and another constant, for example a connection-specific constant, in which case the cells on all connections are evenly distributed in the re-sequencing table.

It is also possible to vary the first embodiment described above in such a way that the check unit does not perform comparison but stores all cells (or pointers) directly in the re-sequencing table, in the memory location indicated by the connection identifier and serial number. The reading unit reads the connection identifier value from buffer ECI_B and the anticipated serial number from the serial number unit. Thereafter the reading unit searches the cell directly from the memory location indicated by the connection identifier value and serial number value. If a cell is found, the reading unit transfers it to the output buffer and updates the anticipated serial number of said connection. If no cell is found, the reading unit returns the connection identifier to the buffer (ECI_B) and takes from the head of the buffer a new identifier for processing. The procedure is thus otherwise similar but in this case no comparison of the order stamps is performed upon arrival of the cell, but all incoming cells (or their memory pointers) are stored in the re-sequencing table and the connection identifiers in a FIFO buffer ECI_B. As a functional block diagram, this embodiment thus otherwise corresponds to FIGS. 5 and 6, but in this case no connections are provided between the check unit and the serial number unit or between the check unit and the output buffer. The reading unit updates the anticipated serial number each time it moves a cell from the re-sequencing table to the output buffer.

The first embodiment disclosed is more advantageous in view of the delay, as therein the majority of packets can be transferred directly to the output queue.

Even though the invention has been explained in the foregoing with reference to the examples in accordance with the accompanying drawings, it is evident that the invention is not so restricted, but it can be varied within the scope of the inventive idea set forth in the appended claims. For example, a connection-specific cell or time counter can be added to the output units of FIGS. 5 and 6 to indicate that more than a given predetermined number of cells have arrived in the re-sequencing table and are waiting, or that the cells in the re-sequencing table have waited a sufficiently long time, in which case it can be presumed that at least one cell has been lost from in between and the anticipated serial number can be incremented by one. As packet-related data, only the memory pointer can be stored in the re-sequencing table and the connection identifier can be searched from the common memory, although this alternative requires extra memory searches. Therefore, when the appended claims make reference to packet data, this shall be construed as referring to a packet or a part thereof or any information by means of which the packet or a part thereof can be found. The output unit can also comprise several connection identifier buffers (ECI_B) for different traffic classes and other connection-specific information that the reading unit can use to favour delay-sensitive traffic, for example.

What is claimed is:

1. A switch arrangement for a packet-switched telecommunications network, which switch arrangement comprises several input ports and several output ports, a switching fabric (SWN), an output unit ($OU_i$) between each output port and the switching fabric, said output unit comprising an output buffer (OB) in which outbound packets are stored, each packet being stored in the output buffer of the corresponding output port after it has left the switching fabric, in accordance with which switch arrangement virtual connections are used for packet switching and serial numbers in packets belonging to each virtual connection are used to identify the relative order of the packets, each virtual connection having a unique connection identifier, and the output unit ($OU_i$) maintains virtual connection-specific information on the serial number of the currently anticipated packet, and the packets belonging to a given virtual connection are ordered in the correct sequence in accordance with the serial numbers of the packets, wherein the serial number of a cell arriving at the output unit is compared to the serial number of the anticipated packet each packet is transferred directly to the output buffer when the serial number and the serial number of the anticipated packet are equal and to a separate re-sequencing memory (RST1, RST2) when the serial number of the packet and the serial number of the anticipated packet are not equal, the re-sequencing memory (RST1, RST2) being in a memory area that is defined at least on the basis of the serial number of the packet, and by means of the re-sequencing memory, packets are transferred to the output buffer by searching in each case packet data from that memory area of the re-sequencing memory which is defined at least on the basis of the anticipated serial number, whereby when the data of a given packet are found said packet is transferred to the output buffer, and whereby when a packet is transferred to the output buffer, the serial number of the anticipated packet is updated.

2. A switch arrangement as claimed in claim 1, wherein the packet data are stored in a memory area that is defined merely on the basis of the serial number of the packet, and storage is performed in the first free memory location starting from the beginning of said memory area, and packet data is searched from the re-sequencing memory from a memory area defined merely on the basis of the anticipated serial number, the search being performed by going through the memory locations of said memory area in succession.

3. A switch arrangement as claimed in claim 2, wherein the re-sequencing memory is a two-dimensional table and that the packet data is stored in and searched from a memory area in the table that is constituted by the row or column indicated by the serial number in each case.

4. A switch arrangement as claimed in claim 2, wherein the number of separately addressable memory locations in said memory area is smaller than the number of supported connections.

5. A switch arrangement as claimed in claim 2, wherein at least the connection identifier relating to the packet is stored in the memory location.

6. A switch arrangement as claimed in claim 1, wherein the memory location is defined on the basis of the serial number of the packet and the connection identifier associated with the packet.

7. A switch arrangement as claimed in claim 6, wherein the re-sequencing memory is a two-dimensional table and that the packet data is stored in and searched from a memory area in the table that is determined from the table element at the junction of the coordinate of the first dimension indicated by the serial number of the packet and the coordinate of the second dimension indicated by the connection identifier associated with the packet.

8. A switch arrangement as claimed in claim 1, wherein the connection identifier carried by a packet arriving at the input port is formed into a connection identifier internal to the switch, which is inserted into the packet to be transported through the switching fabric.

9. A switch arrangement as claimed in claim 1, wherein packets are stored in a common memory (CM) and the packet data include a pointer to the area in the common memory in which the packet is stored.

* * * * *